(12) United States Patent
Klein

(10) Patent No.: US 7,230,539 B2
(45) Date of Patent: Jun. 12, 2007

(54) PET IDENTIFICATION TAG WITH INTERNAL CAVITY FOR TRANSPONDER CAPSULE

(76) Inventor: Elliot S. Klein, 210 E. 15th St., Unit 6K, New York, NY (US) 10003

( * ) Notice: Subject to any disclaimer, the term of this patent is extended or adjusted under 35 U.S.C. 154(b) by 171 days.

(21) Appl. No.: 11/160,415

(22) Filed: Jun. 22, 2005

(65) Prior Publication Data

US 2006/0087440 A1   Apr. 27, 2006

Related U.S. Application Data

(60) Provisional application No. 60/622,287, filed on Oct. 26, 2004.

(51) Int. Cl.
*G08B 23/00* (2006.01)
*A62B 35/00* (2006.01)
(52) U.S. Cl. .................... 340/573.3; 119/863
(58) Field of Classification Search ............ 340/573.3, 340/572.1; 40/649; 119/863, 858
See application file for complete search history.

(56) References Cited

U.S. PATENT DOCUMENTS

| | | | |
|---|---|---|---|
| 5,025,550 A | 6/1991 | Zirbes | 26/605 |
| 6,259,367 B1 | 7/2001 | Klein | 340/572.1 |
| 6,283,065 B1 * | 9/2001 | Shorrock et al. | 119/863 |
| 6,305,329 B1 | 10/2001 | Levy | 119/858 |
| 6,577,241 B2 * | 6/2003 | Neidig et al. | 340/573.3 |
| 6,792,465 B1 | 9/2004 | Welsh | 709/229 |
| 6,975,233 B2 * | 12/2005 | Grose et al. | 340/573.1 |
| 2001/0027401 A1 | 10/2001 | Klein | 705/1 |
| 2005/0268864 A1 * | 12/2005 | Gallagher et al. | 119/858 |

* cited by examiner

*Primary Examiner*—Jeffery Nofsass
*Assistant Examiner*—Sigmund Tang
(74) *Attorney, Agent, or Firm*—Michael B. Fein; Cozen O'Connor

(57) ABSTRACT

A pet identification tag with associated cavity holder for insertion of a miniaturized Radio-frequency identification ("RFID") transponder capsule. The tag has an embedded cavity and mechanism to insert or remove an optional RFID transponder capsule. The tag with transponder capsule can then be attached to a pet's collar to wireless ID the pet without need to medically inject a RFID transponder capsule into a pet's body by surgical means.

16 Claims, 14 Drawing Sheets

PET IDENTIFICATION TAG WITH INTERNAL CAVITY FOR TRANSPONDER CAPSULE

BACKGROUND OF THE INVENTION

The present invention relates to an animal tag of multiple shape configurations, preferably of symmetrical shapes, that has an associated case with a hollow cavity that is utilized as part of a novel plastic animal ID tag, attached to an accessory such as a dog or cat collar or leach, to assist in helping identify a pet and/or its owner. The case is configured to hold an optional RFID transponder capsule within a hollow cavity in the attachable pet tag case.

Injectible RFID capsules have been provided to shelters, veterinarians and pet hospitals in the form of a miniature glass-like capsule that is injected into the animal with a special syringe. Examples of RFID transponder capsule products for companion animals (i.e., dogs and cats) and more fully described in U.S. Pat. No. 5,025,550 assigned to Trovan Limited. These systems typically work by injecting the tiny chip in the form of a fully assembled transponder that is encapsulated in a housing which is normally composed of glass or ceramic material (typically 1.2-2 mm wide and can even be smaller) into the animal's body with the pet shelters using an RFID reader, such as those made by AVID, to read a unique identifiable code that is wirelessly emitted from the chip to help identify the animal.

Combination syringe and capsule transponders are sold by many companies, one of several companies that market injectible microchips for pets. With the pinch of a syringe, the microchip is inserted under the skin in a procedure that takes less than 10 minutes and leaves no stitches. Small implantable transponders, approximately 13.3×2 mm are supplied in encapsulated form in a biocompatible glass tube and delivered in a sterile one-way injectible syringe. Once the capsule is injected into a pet, silently and invisibly, the dormant chip stores a code that releases pet-specific information when a scanner passes over.

Several million RFID transponders have been injected into pets using this internally injected encased capsule identification method representing the preferred and current method of micro chipping pets to help identify them by storing information related to the pet linked to a database when the transponder is read, typically at animal pounds or shelters that are equipped with transponder readers. The microchip is intended to help identify pets for medical purposes or pet and owner identification purposes.

The advantage of having a microchip ready detachable tag accessible outside of an animal's body, such as attached to collar ID tag, is that the user can still receive the benefits afforded by a microchip without the associated surgical insertion procedure. Having the tag in an accessed external tag position reduces the expense to pet owners and thereby increases the likelihood of usage of the tag, in contrast to requiring the user to visit a vet or animal professional to inject or make a choice to use a particular brand of RFID tag from among several possible choices. The tag can also be updated with new transponder capsule(s).

As noted above, having the tag already accessed and in a useable position outside of an animal's body is advantageous for the tag supplier as it enhances the opportunities for optional inclusion and use of the RFID capsule tag. Accordingly, suppliers of conventional animal tags desire the advantages of having their particular tag physically inserted by the end-user, or placed by manufacturer or seller, into the tag cavity for placement outside of the pet's body. In the case of a conventional animal tag, the user typically can select from a number of such RFID tags and has a choice among tags for use. For example, the user may often choose from or exchange different RFID capsules for animal ID depending on features desired. This is a useful feature considering that some foreign countries require pets to have a microchip for travel to their locations and the specific type of chip frequency and standards vary from country to country. Having the ability to upgrade to the proper chip for pet travel or asset identification purposes is advantageous. It is even possible to replace an existing capsule with a new RFID capsule for program renewals, updates or future product feature enhancements. Thus, the supplier of the conventional animal tag would obtain an advantage over other conventional animal tags described in prior art by having the capsule in the tag within an upgrade cavity position, in contrast to the other identification tags that merely put a nametag on an owned object with return instructions that typically feature a name and phone number or other identifier affixed to or printed onto the tag.

This invention improves upon pet identification tags described in prior art such as U.S. Pat. No. 6,305,329 to Levy, Jr., that teaches a permanent pet collar identification tag and label system on a pet collar buckle. In contrast, the instant invention provides an improved and detachable pet identification tag with internal cavity for optional transponder capsule. The microchip transponder on a separate detachable tag mechanism is an enhancement to provide reliable electronic information about pets in conformance to different local standards imposed by state and local companion animal identification requirements. For the first time, it also permits the end-user or pet owner an opportunity to take advantage of the benefits of a conventional microchip transponder capsule (i.e., without the need to visit a vet for a surgical procedure to inject it within the animal's body). Such option allows for pet owners to later upgrade their chip by adding the transponder, replacing their chip capsule, or even removing it completely from the cavity when they are concerned about privacy or wish to insert alternate transponder capsules with new features and benefits as they become available or otherwise required under international or local animal control regulations (i.e., regulatory requirements for United States pet travel to Europe where animal must have a specific microchip for admittance into certain EU countries).

This invention improves upon U.S. Pat. No. 6,792,465 to Welsh and U.S. Pat. No. 6,283,065 to Shorrock, by incorporating a technological innovation with a new and useful process to incorporate an owner-controlled and accessible microchip transponder capsule innovation manufactured and contained within a cavity of a tag casing.

Such microchip tag innovation can facilitate finding lost pets under the inventor's U.S. Pat. No. 6,259,637 to Klein, that teaches a lost and found system and method by RFID technological innovation. Such RFID devices can also be used to provide reward incentives to the finder of wayward pet or other tagged objects using the system and method of Klein's allowed patent under Publication No. 20010027401, Ser. No. 09/847,913.

SUMMARY OF THE INVENTION

The present invention provides an animal tag and associated case or holder. The tag has a configuration that complements the configuration of the case so that the tag has an internal cavity that can be easily accessed by the holder for adding or removing a small RFID capsule transponder, that is maintained inside the case in a covered position and is protected from abuse. The case is designed to be lightweight and easily attached to an animal's collar or other detachable connection device for asset tracking and identification applications.

In one or more embodiments, the tag is an animal tag to be applied to companion animals such as dogs and cats. The same tag can also be suitable to provide identification and protection to other assets such as airline baggage, cell phones, portable computers and other high-value assets that need to be identified by an external housing tag device. The tag has front and back side panels that form a tag casing. In one or more embodiments, the shape of the tag is asymmetric about a vertical centerline with one end being of less width than the other end. In one or more embodiments, the tag is symmetrical about a vertical and/or horizontal centerline, but is of non-rectangular shape. In another embodiment, the tag is square in shape, and smaller than a conventionally sized tag.

The tag also has a first tag-connecting portion on a first side, or upper edge, of the tag between the first end and the second end. The first tag-connecting portion has at least one convex portion along the upper edge between the first and second ends. The tag also has a second tag-connecting portion on a second side, or lower edge, of the tag between the first end and the second end. The second tag-connecting portion has at least one concave portion along the lower edge.

The upper and lower case portions and the tag may be thin, elongated members formed of a plastic substrate, such as where the tag is a plastic animal tag. One or more RFID capsules may be placed within the case, depending on the cavity structure of the case.

Pet owners can be provided with the external tag at time of pet adoption or other event complete with a specially sealed and wrapped RFID tag enclosed within the tag's casing. As attractive as they are, RFID tracking products, including U.S. Passports that include RFID identification tags, have been a source of controversy. While the United States is planning RFID inclusion in U.S. Passports at this time, several advocacy groups are suggesting that U.S. citizens encase their Passport in tin foil to keep safe from skimming attacks.

As attractive as RFID tagging is to recovering lost assets such as airline baggage or pets, some people prefer not to take immediate advantage of the wireless identification and tracking functions offered by external casing asset identification tags that include an RFID transponder. The reasons include fear of privacy invasion and potential service fees associated with a RFID tracking service and registration system. Annual fees may be charged for the RFID tracking and recovery service and/or membership if the customer places the RFID into use and the tag is subsequently registered.

To accomplish this step, the customer would remove the thick paper that wraps the RFID transponder capsule to be able to activate the tracking and associated asset identification functions of the instant invention. In this way, customers can take their time to learn about RFID tracking applications and make their own decision anytime to activate their device by removing the special paper surrounding the RFID capsule encased within the cavity housing their identification tag.

The 0.2 mm thick paper that surrounds the RFID transponder capsule contains a thin layer of metal, and essentially functions as a Faraday Cage—so it is similar to the result that would be achieved by wrapping the tag in a metal sheet that shuts out electromagnetic fields.

Various other features, advantages and characteristics of the present invention will become apparent after a reading of the following specification.

DETAILED DESCRIPTION OF THE DRAWINGS

Figure 1:
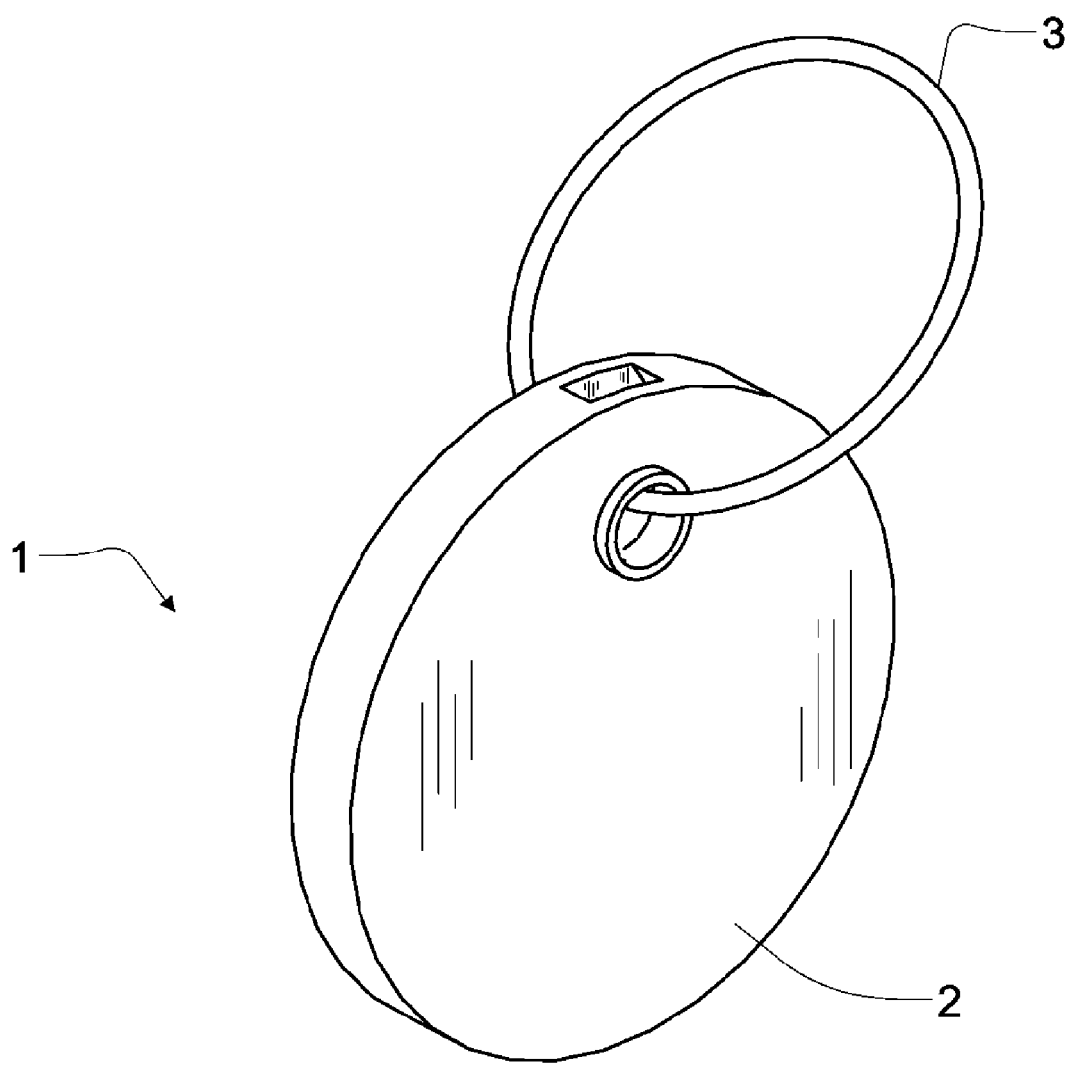
FIG. 1 is a top plan view of one embodiment of the tag of the present invention with a connecting ring hanging.

With reference now to the drawings, FIG. 1 is a front panel perspective view of a tag 1 for a pet, with a surface area 2 to print pet identification information, and hanging device 3, such as circular ring hook, that can be attached to the collar tag of a dog or cat.

Figure 2:
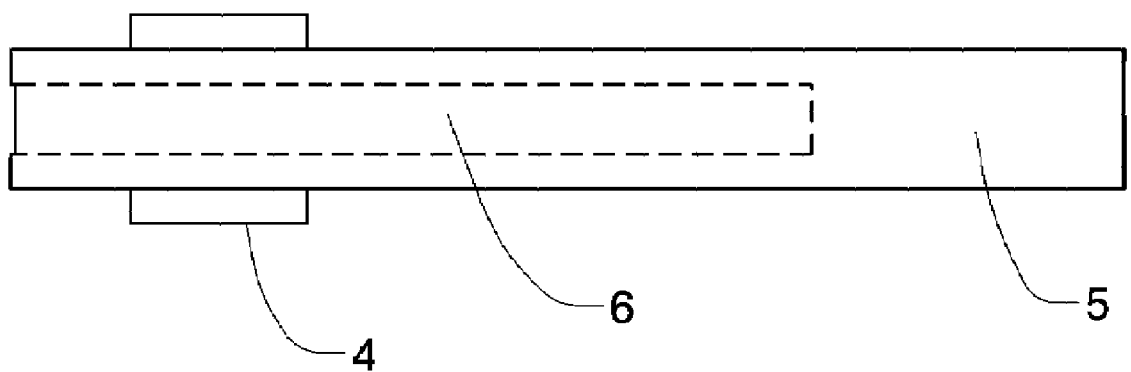
FIG. 2 is a side view of one embodiment of the tag and case of the present invention.

FIG. 2 is a side view showing how an optional tag sealing sleeve 4 that can be removed to insert the transponder chip into a cavity chamber 6 that is sandwiched between the front and back side 6 of the tag casing.

Figure 3:
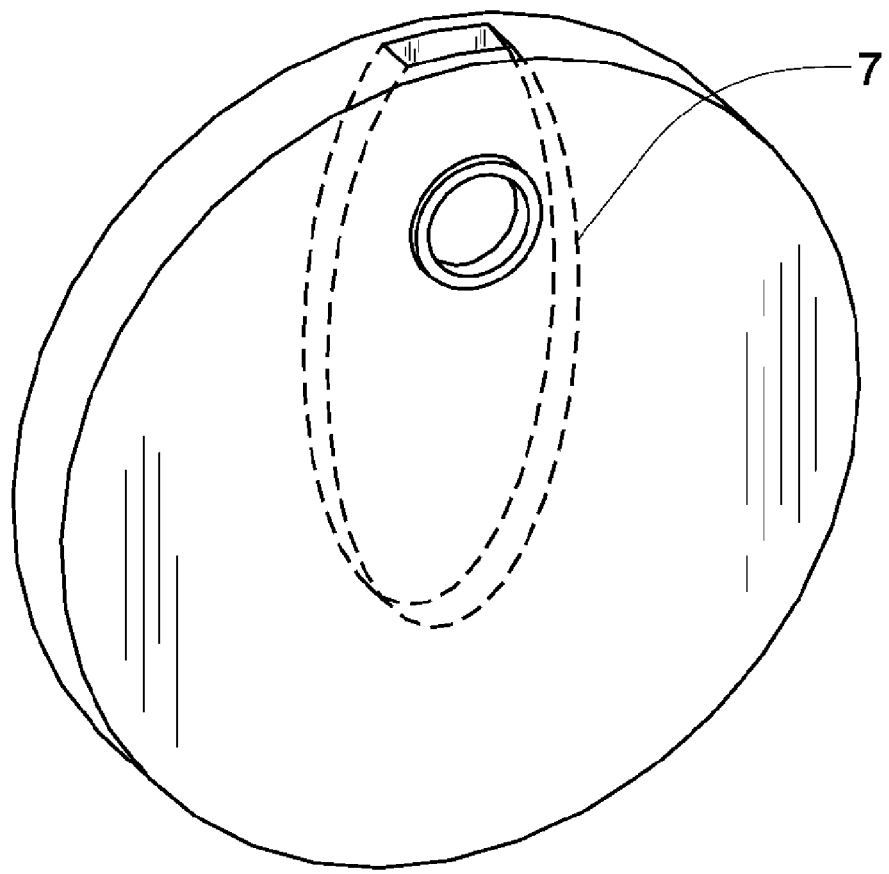
FIG. 3 is a top plan view of one embodiments of the tag with a longitudinal cross section that shows the inside cavity hidden within the tag case front and back panels that is capable of holding a transponder capsule.

FIG. 3 shows the cavity 7 section within the tag that is an enlarged exploded perspective view of the cavity and showing a top opening of a hole that can be adapted for receiving the RFID transponder capsule into the internal tag cavity.

Figure 4:
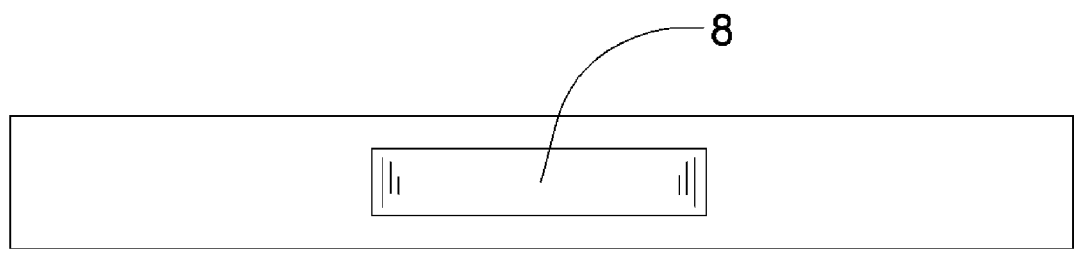
FIG. 4 is a top plan view of one embodiment of the top of the tag case of the present invention that shows the hole to insert an optional internal capsule chip.

FIG. 4 shows the top 8 opening of receiving cavity to accept the optional RFID transponder capsule that can be inserted or removed by the user and protected within the tag cavity.

Figure 5:
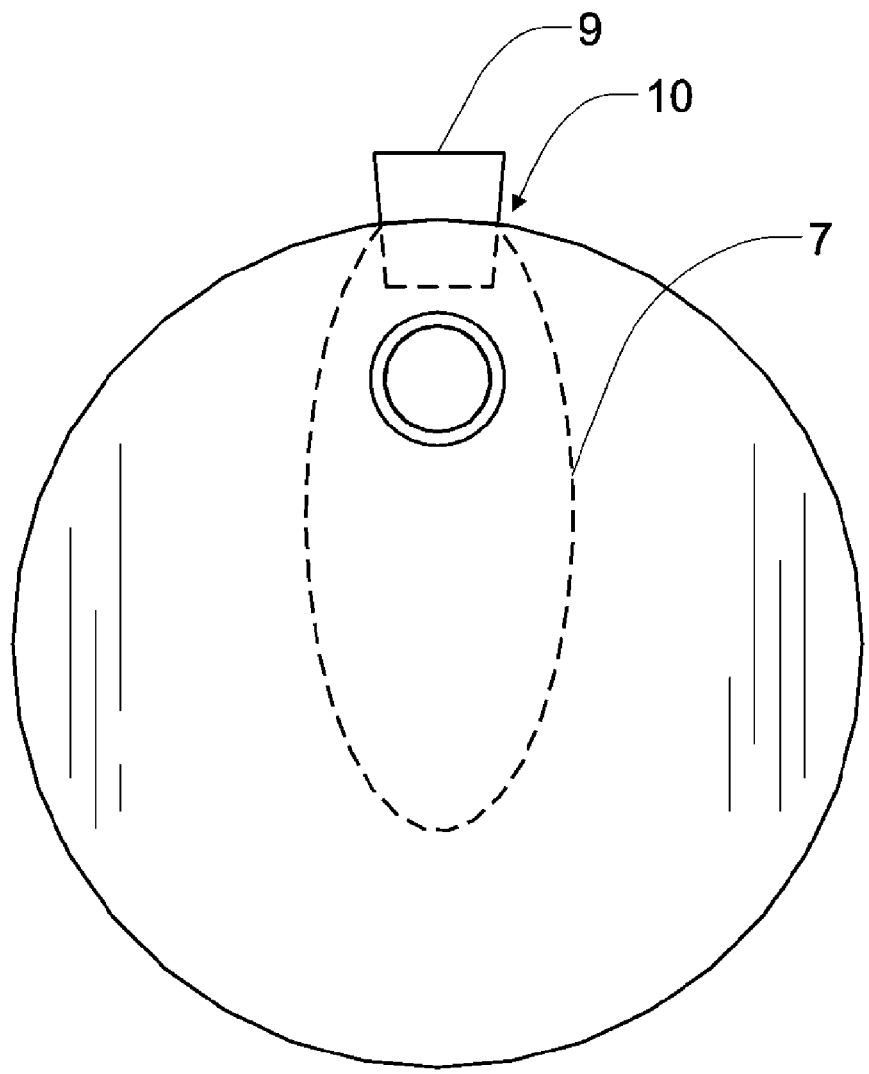
FIG. 5 is a top plan view showing the tag with the rubber or plastic protective top piece being partially inserted to seal and protect the transponder chip within the tag case so it in the fully sealed position within the case.

FIG. 5 shows a top seal, generally composed of rubber or plastic, that fits on the top area of the opening 8 shown in FIG. 4. This cap can be inserted or later removed by the pet owner to add or remove a transponder chip capsule into the case cavity 7 by removing or inserting it in the opening 10 on top of the tag casing. The cavity area with associated seal can be placed directly adjacent to the attachment hole area opening so when fully inserted, the seal is flush with outer edge of the tag to more fully protect the transponder capsule from environmental damage with an airtight seal.

Figure 6:
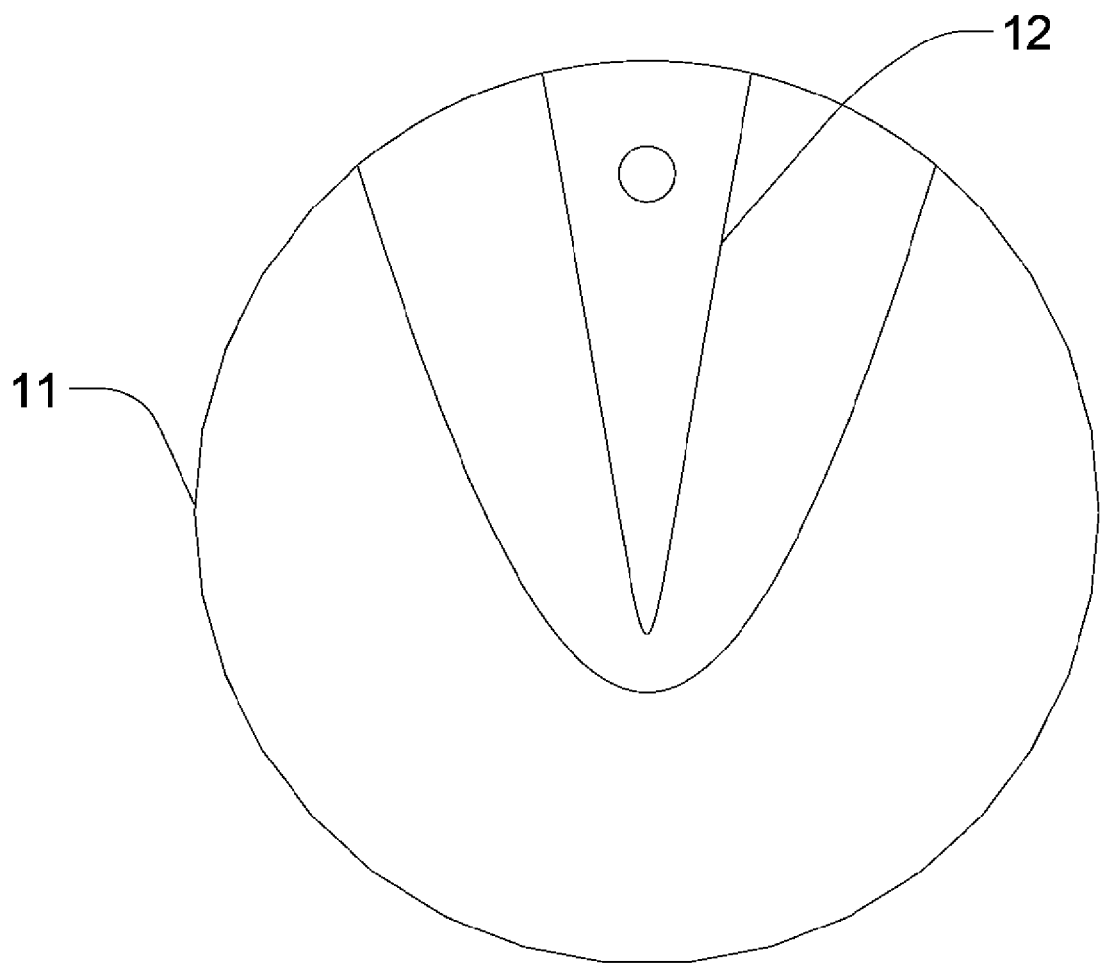
FIG. 6 is a perspective view showing one embodiment of the front surface of the tag and the upper portion of the case of the present invention showing the raised protrusion that can form an extended cavity area for holding the transponder capsule.
Figure 7:
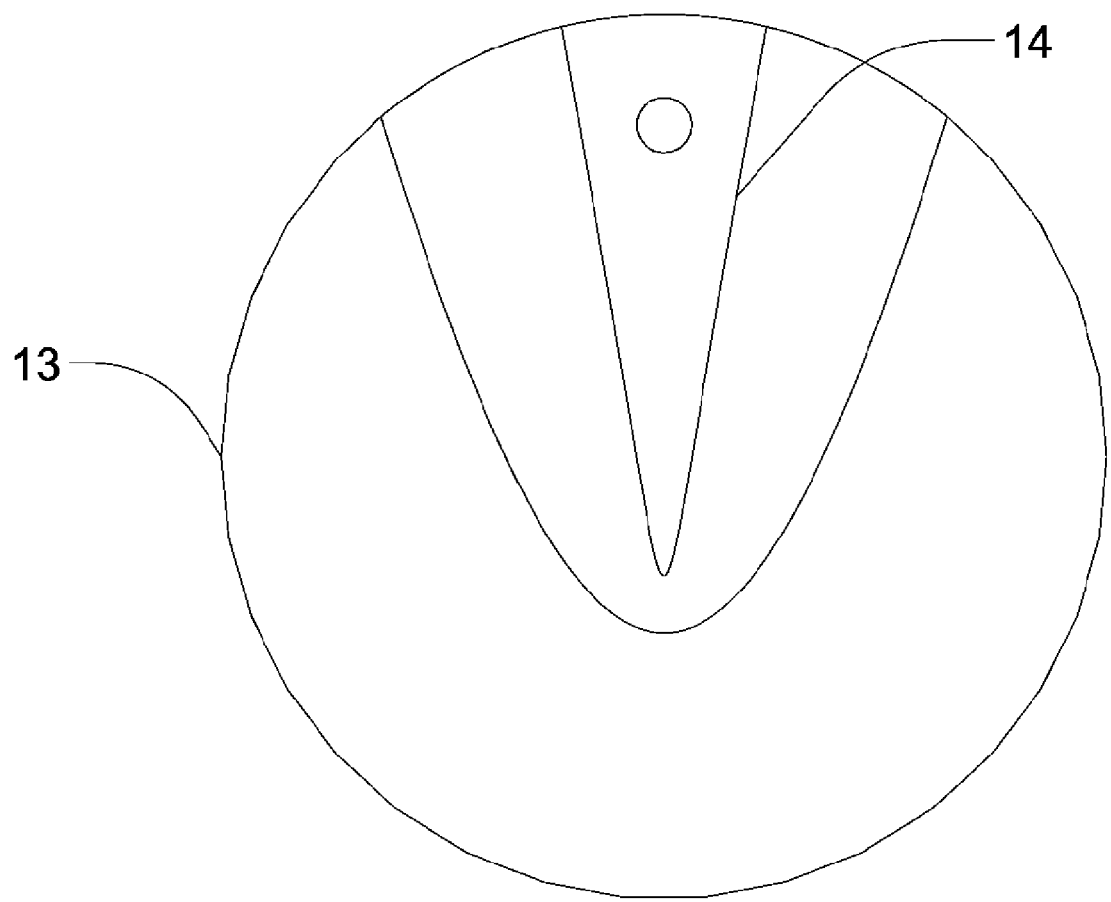
FIG. 7 is a perspective view showing one embodiment of the back surface of the tag and the upper portion of the case of the present invention showing the raised protrusion that can form an extended cavity area for holding the transponder capsule.

FIGS. 6 and 7 show the pet identification tag front 11 and back 13 surfaces with a raised area to house the internal cavity compartment After the user has added identification data to inside of the identification tag 11 and affixed the sealing cap 9 shown in FIG. 5, the tag is fully operational as both a visual and electronic transponder based identification tag for pets. Items 12 and 14 correspond to the protrusions on the front and back sides in FIGS. 6 and 7.

Figure 8:
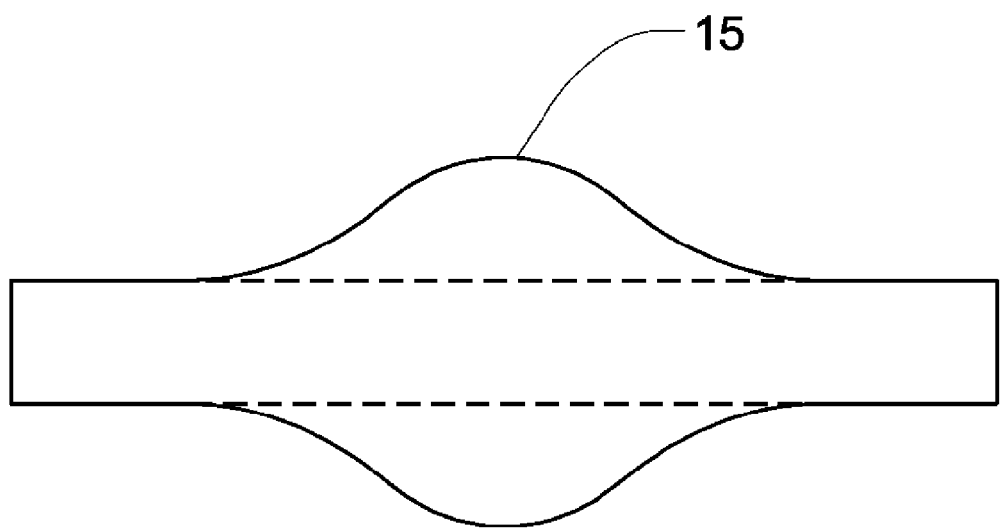
FIG. 8 is a top plan view of another embodiment of the tag of the present invention that shows the top entry area where the transponder chip can be inserted into the tag case cavity, prior to sealing with the rubber or plastic sealing device shown in FIG. 5 above.

FIG. 8 shows a top view of the cap area previously described that houses and protects the optional enclosed transponder by a protruding protection area 15 that extends in a combined convex and/or concave design to provide a protection area to house and protect the transponder capsule.

Figure 9:
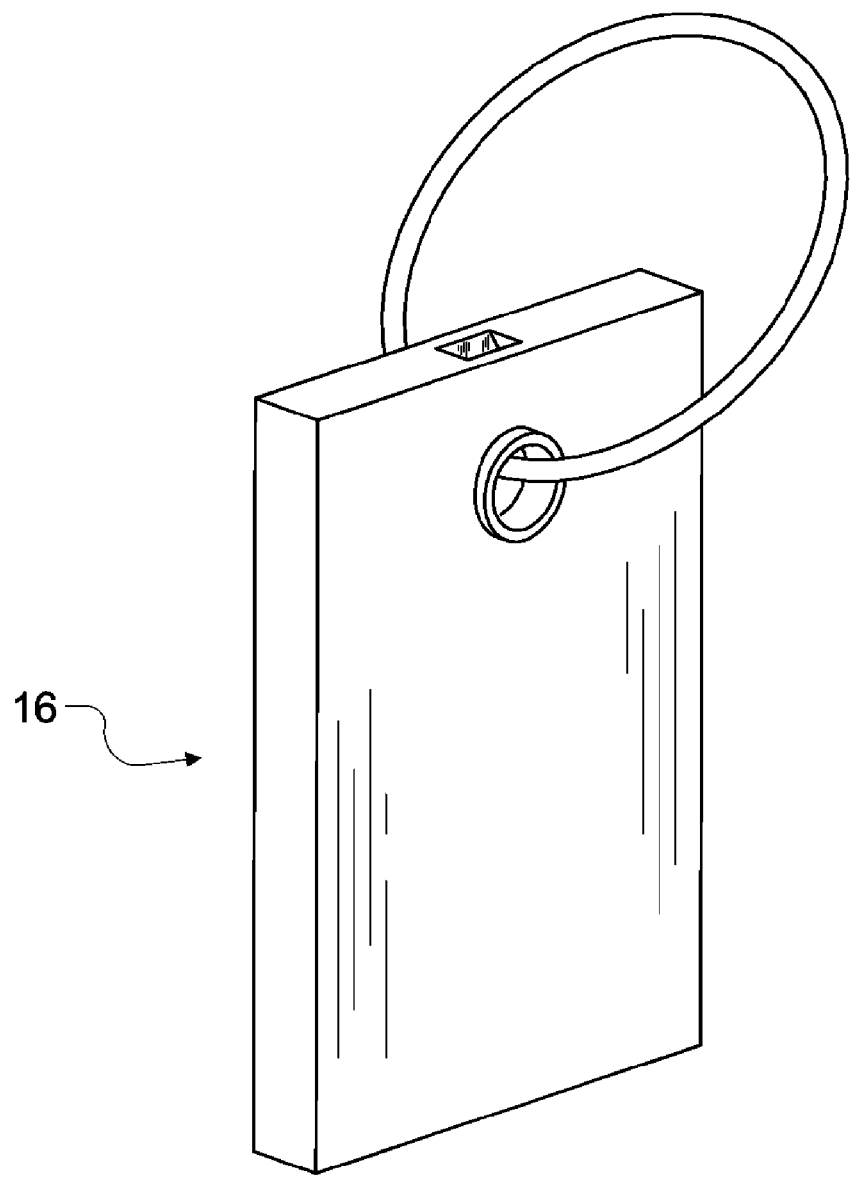
FIG. 9 is a top plan view of another embodiment of the tag of the present invention in which the tag is symmetric about a centerline and square in shape.
Figure 10:
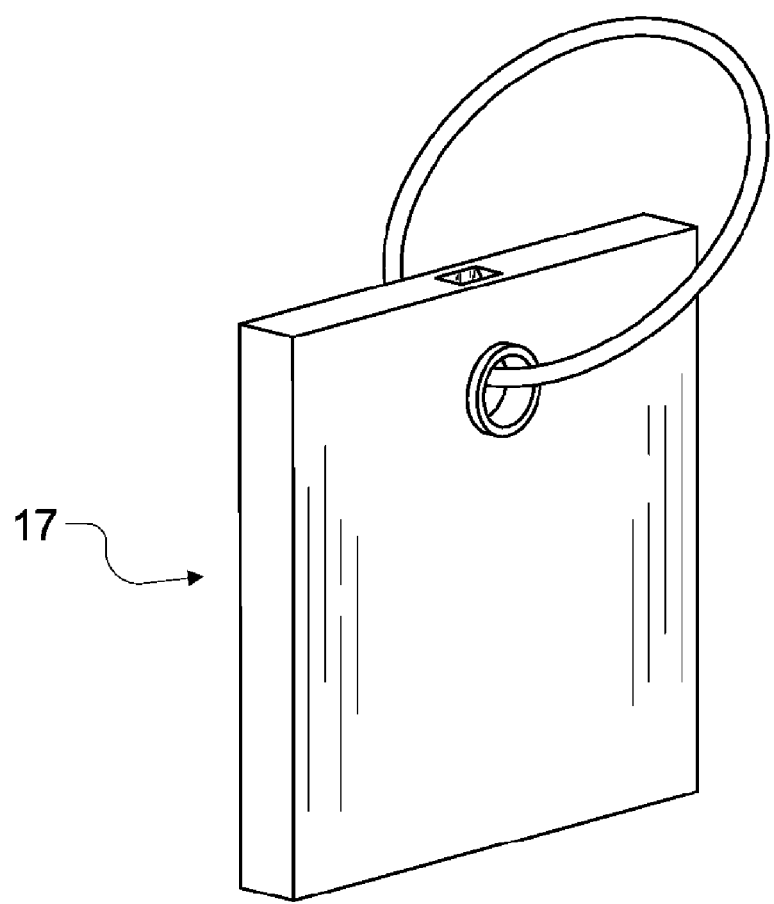
FIG. 10 is a top plan view of another embodiment of the tag of the present invention in which the tag is symmetric about a centerline and rectangular in shape.
Figure 11:
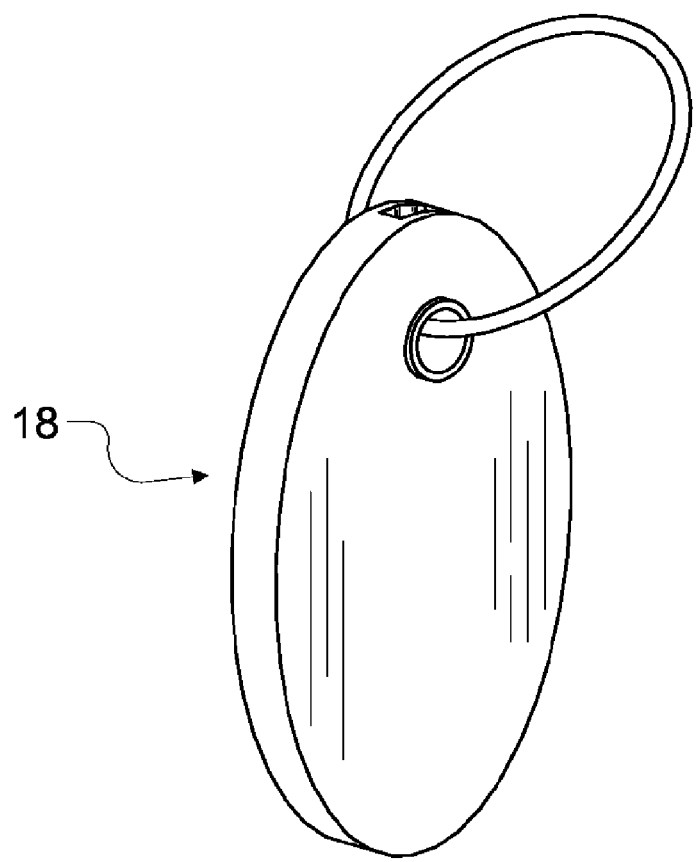
FIGS. 11-14 show alternate feature embodiments of identification tag device and alternate design configuration options.

FIGS. 9, 10, and 111 show an alternate embodiment of identification tag device, such as rectangular 16, or square 17, or oval 18 shaped alternate design configuration options.

Figure 12:
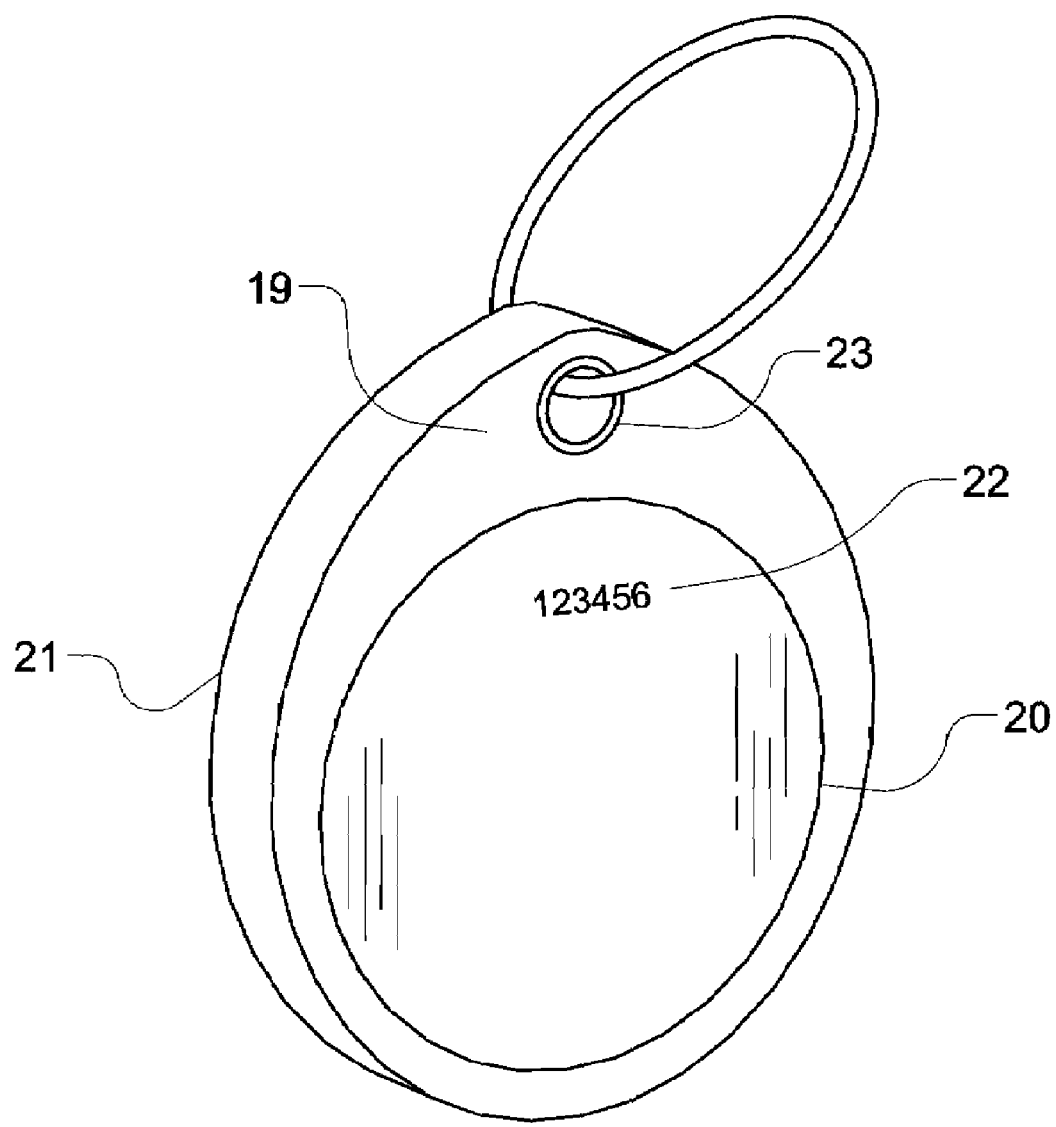

FIG. 12 shows an alternate embodiment of the identification tag device with a ring attachment shown, wherein the tag 20 may be further encased in a separate and secondary plastic holder 21 with thin flange 19 to provide additional protection from damage with a hole 23 on the secondary holder to insert a ring attachment to apply the tag and supplemental case holder to a pet's collar. In this way the hole is placed on the secondary plastic casing holder without need to punch the hole in the tag itself. This embodiment provides additional surface area room for the printing alphanumeric data 22 on the tag front and back surfaces. The alternate case holder can be delivered in two parts that snap together to sandwich the tag in between the flange. In this way, the case may be accessed at a later date to insert or remove a transponder capsule device.

Figure 13:
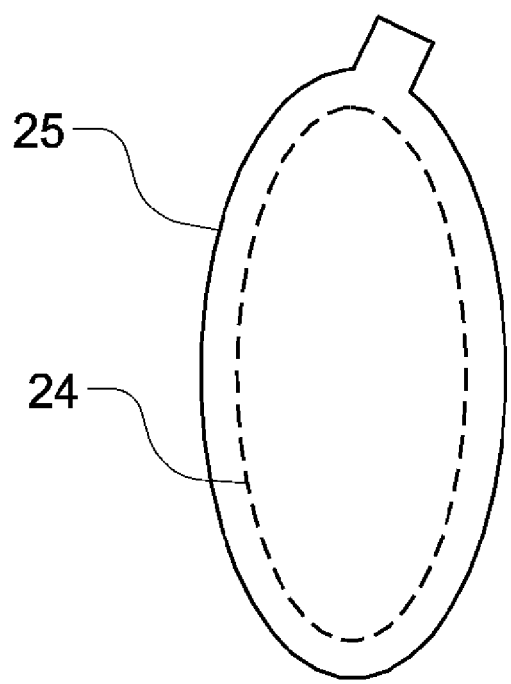

FIG. 13 shows a microchip transponder capsule 24 that has been tightly surrounded and packaged 25 in metal foil or other suitable radio frequency transmission shielding material. This microchip transponder capsule 24 can be supplied in the sealed mode within the tag cavity area so the pet owner or other end-user is required to take a physical step to activate the tag properties such that it becomes a fully functional wireless transponder. Such step would include user opening the outer tag casing for access to the RFID transponder capsule and then peeling off the shielding material prior to reinserting into the tag cavity.

Figure 14:
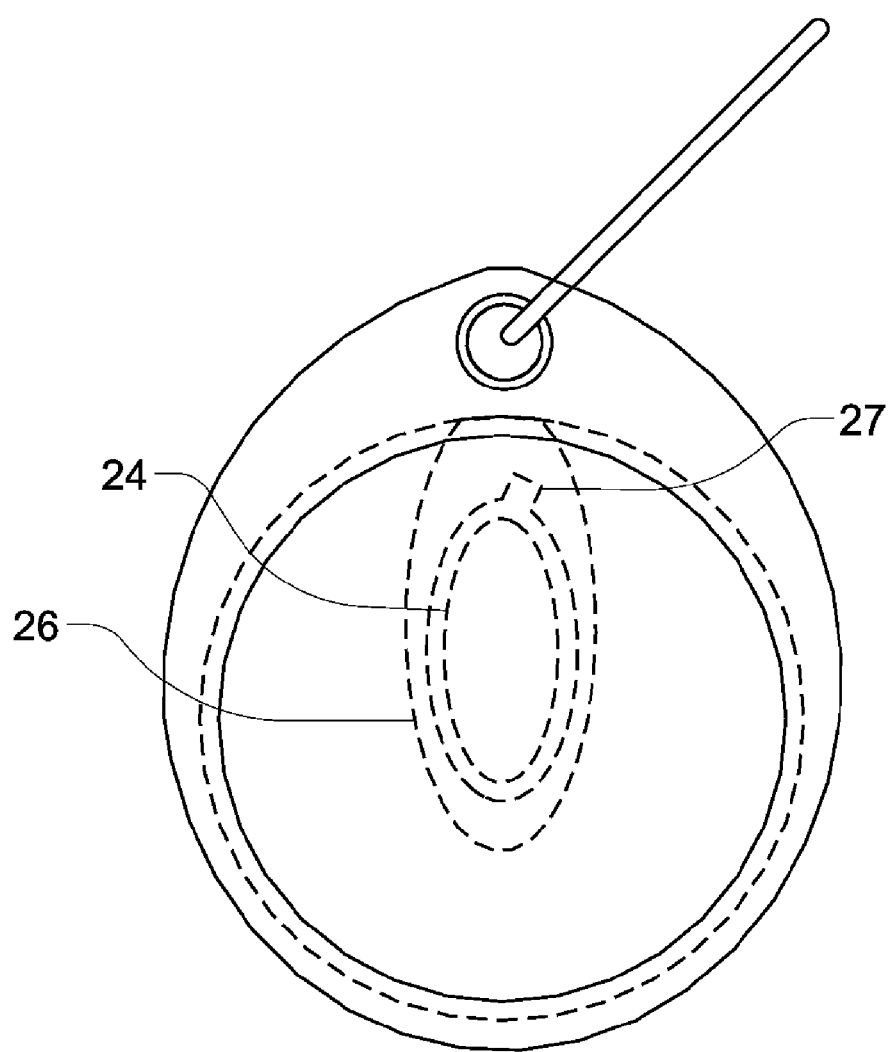

FIG. 14 shows a see thru view of capsule transponder 24 within the user accessible tag case cavity 26 and peel off shielding 27 material that can be optionally removed to activate the transponder capsule's radio frequency transmission properties.

Although particular embodiments of the invention have been illustrated and described, various changes may be made in the form, composition, construction, and arrangement oaf the parts herein without sacrificing any of its advantages. Therefore, it is to be understood that all matter herein is to be interpreted as illustrative and not in any limiting sense, and it is intended to cover in the appended claims such modifications as come within the true spirit and scope of the invention.

What is claimed is:

1. An animal tag comprising a hollow cavity to insert or remove a Radio Frequency Identification ("RFID") device enclosed within a capsule, a closure device to seal the RFID device within the hollow cavity, a front and back side that will readily accept printed identification data, and a hole to insert a connector that can affix said tag to the animal's collar or leash, the tag having a circular or asymmetrical configuration, the closure device to seal the RFID device within the hollow cavity being retained in place when the connector is inserted through the hole and the closure device removable when the connector is not inserted through the hole.

2. The tag of claim 1 wherein said case has an aperture therein to permit passage of a small capsule shaped RFID transponder device, the capsule that is 1.2-2 mm wide and 13.3 mm long.

3. The tag claim 1 having an aperture therein to permit passage of a small disc shaped capsule RFID transponder device that is 22 mm wide and 1.2 mm high.

4. The tag of claim 1 comprising both visual and electronic pet microchip identification mechanisms, said tag having a front surface and a back surface, each of said surfaces defining a surface area on oppositely oriented front and back faces of said tag, said tag having a front and upper tag end with at least one slightly extended protrusion formed of a first side radius, said tag also having a back side with at least one extended protrusion formed of a second tag radius, both adapted to provide spacing for an internal cavity to accommodate and protect the RFID capsule device within said cavity.

5. The tag of claim 1 having a hollow cavity portion below a connecting portion between said front and said back tag surface panels, with a small cavity access hole, 3 mm to 24 mm wide, that includes a removable rubber or plastic top sealing cap that may be placed to close and protect the RFID capsule device within said cavity by inserting the top seal between the top connecting portion of the upper surface areas of said tag to permit access or closure to said cavity.

6. The tag of claim 1 wherein a convex curvature of said front and back covers blends smoothly into said rounded portion of said top end.

7. The tag of claim 1 wherein a concave curvature of said first cover connecting portion blends smoothly into said rounded portion of said first cover end.

8. The tag of claim 1 wherein said tag attaches to detaches from a pet collar by a circular connecting ring or hook attachment.

9. The tag of claim 1 wherein said hole to insert a connector is formed by a generally cylindrically shaped hollow cavity and sealed with a removable plastic or rubber reinforcement closure to hold the circular ring.

10. The tag of claim 1 wherein said front and back case portions of said tag are thin elongated members formed of a plastic substrate.

11. The tag and case of claim 1 wherein said front and back case surface portions are designed to accept printed alphanumeric information which includes a reference to the microchip capsule's unique identification number.

12. The tag of claim 1 wherein the RFID is encased in a separate and secondary plastic holder with a thin flange to provide protection from damage with a hole in the secondary holder to insert a ring attachment to apply the tag and supplemental case holder to a pet's collar and wherein no hole is punched in the tag.

13. The tag of claim 1 where including surface areas on oppositely oriented front and back faces of said tag.

14. The tag of claim 1 including an RFID transponder a protective layer of paper or metal that surrounds the RFID capsule to shut out electromagnetic fields and the associated ability of the transponder capsule to operate in a wireless radio frequency mode until the wrapper is physically removed.

15. The tag of claim 1 where an RFID microchip capsule is supplied in the cavity and is supplied encased in radio frequency shielding material, with a user removable peel-open or peel-off tab designed to shield and protect the transponder from being read by radio frequency methods until such time as the user chooses to activate the transponder capsule function by peeling off or opening the protective cavity seal, which enables the tag within the cavity to be externally read by radio frequency transponder methods.

16. The tag in any of claims 1, 2, 3, 4, 5, 6, 7, 8, 9, 10, 11, 12, 13, 14, or 15 includes a removable RFID capsule enclosed within the tag's sealable hollow cavity.

* * * * *